(12) United States Patent
Kurita et al.

(10) Patent No.: US 6,650,845 B1
(45) Date of Patent: Nov. 18, 2003

(54) OPTICAL REPEATER USING TWO MODE-LOCKED LASER DIODES FOR REGENERATING OUTPUT PULSES OF SAME WAVELENGTH AS INCIDENT OPTICAL PULSES

(75) Inventors: Hisakazu Kurita, deceased, late of Ehime (JP), by Chizuko Kurita, legal representative; Hiroyuki Yokoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 503 days.

(21) Appl. No.: 09/694,865

(22) Filed: Oct. 24, 2000

(30) Foreign Application Priority Data

Oct. 27, 1999 (JP) .......................................... 11-304793

(51) Int. Cl.[7] .......................... H04B 10/02; H04B 10/00
(52) U.S. Cl. ........................ 398/175; 398/180; 398/154
(58) Field of Search .............................. 398/82, 91, 97, 398/173, 175, 176, 154, 155, 180

(56) References Cited

U.S. PATENT DOCUMENTS

| 5,784,184 A | * | 7/1998 | Alexander et al. ............. 398/91 |
| 6,108,125 A | * | 8/2000 | Yano ........................... 359/344 |
| 6,453,082 B1 | * | 9/2002 | Watanabe ...................... 385/15 |
| 6,532,091 B1 | * | 3/2003 | Miyazaki et al. ............ 398/175 |

OTHER PUBLICATIONS

Wada et al. "10Gbit/s Optical Code Division Multiplexing Using 8–Chip BPSK–Code Wlth Time–Gating Detection" Sep. 1998, ECOC, pp. 335–336.*
"All–optical 3R regeneration of 10 Gbps RZ Optical data pulse with mode–locked laser Diode devices", H. Kurita et al, CPT Technical Digest, pp. 139–140.

* cited by examiner

Primary Examiner—Leslie Pascal
Assistant Examiner—Dalzid Singh
(74) Attorney, Agent, or Firm—Scully, Scott, Murphy & Presser

(57) ABSTRACT

An optical repeater includes an optical splitter for splitting an optical input data pulse stream of wavelength $\lambda_0$ into first and second components. The first component is supplied to a first. mode-locked laser diode to produce a first clock pulse stream of wavelength $\lambda_1$ which is synchronized to the input data pulse stream. The first clock pulse stream is fed to a second mode-locked laser diode to produce a second clock pulse stream of wavelength $\lambda_0$ which is synchronized to the first clock pulse stream. The second clock pulse stream is entered to an optical gate. The second component of the input data from the splitter is amplified sufficiently to control the optical gate to modulate the second clock pulse stream so that the data pulse pattern is impressed on the second clock pulse stream.

6 Claims, 2 Drawing Sheets

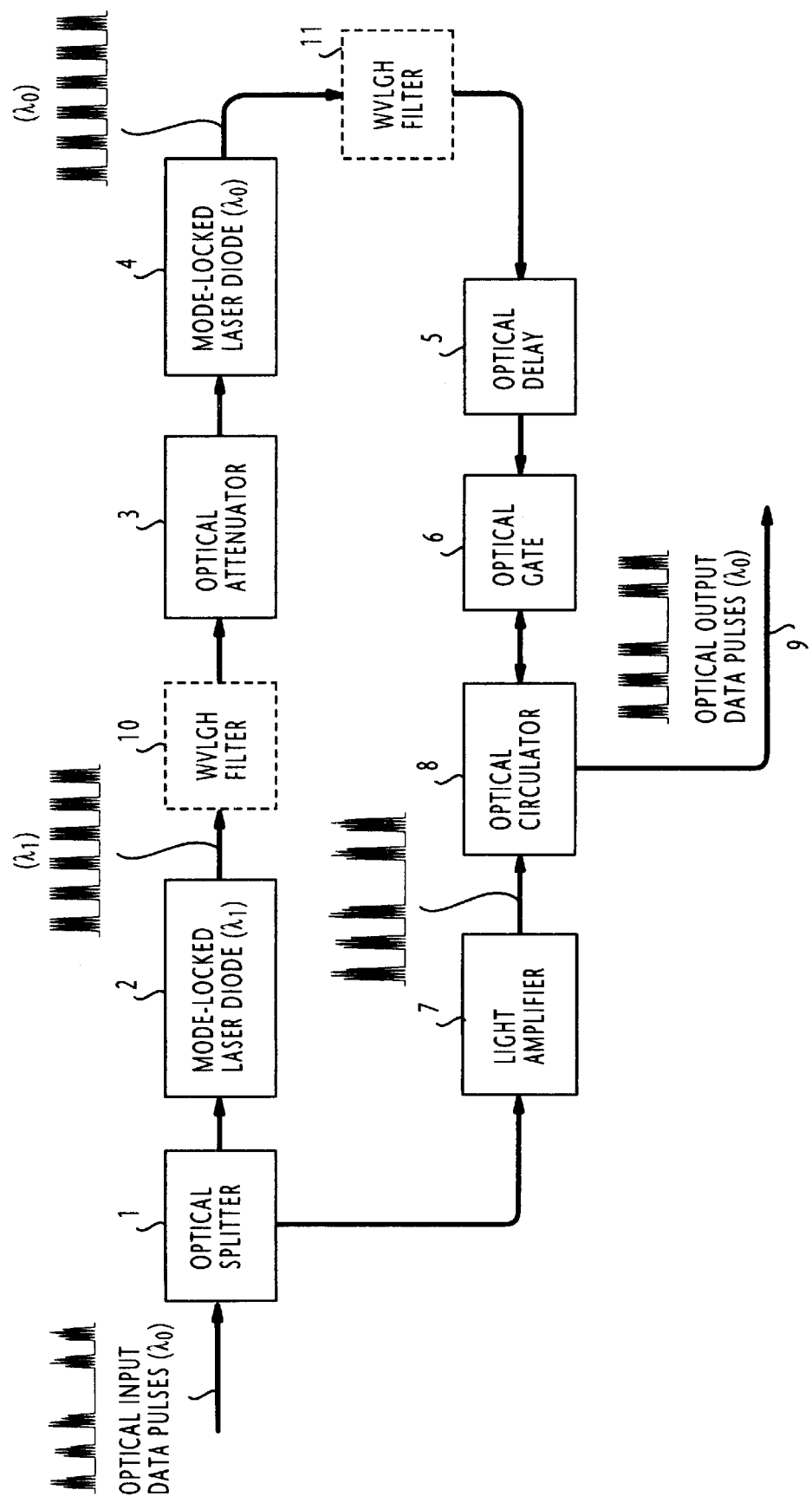

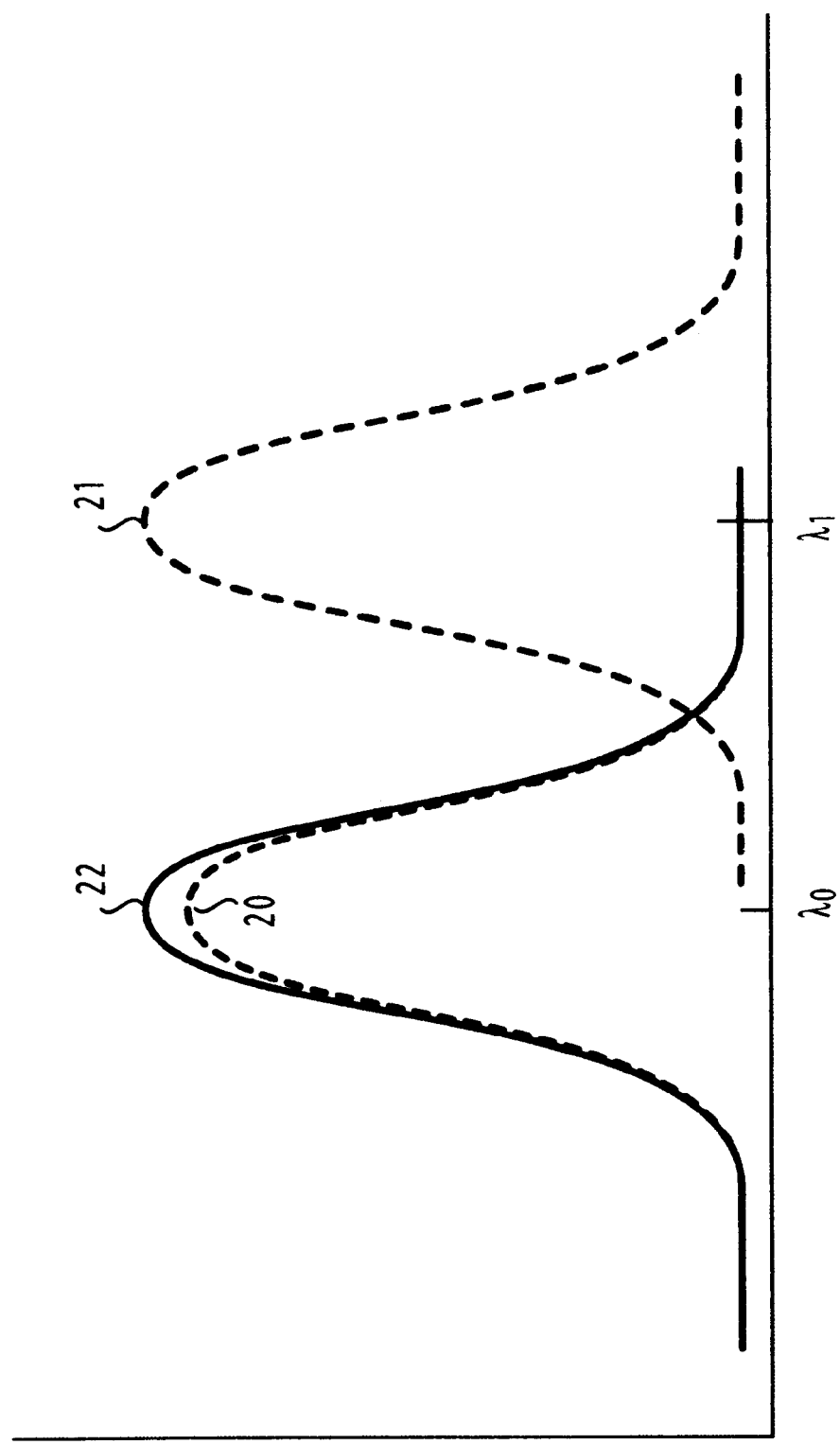

OPTICAL REPEATER USING TWO MODE-LOCKED LASER DIODES FOR REGENERATING OUTPUT PULSES OF SAME WAVELENGTH AS INCIDENT OPTICAL PULSES

BACKGROUND OF THE INVENTION

1. Field of the Invention

The present invention relates to all-optical 3R (retiming, reshaping and regenerating) regeneration of optical data pulses.

2. Description of the Related Art

In a current optical repeater, as described in a paper "All-optical 3R regeneration of 10 Gbps RZ optical data pulse with mode-locked laser diode devices", H. Kurita et al, CPT Technical Digest, pages 139–140, a optical data pulse stream is split into a first input that is incident on a mode-locked laser diode and a second input that enters a light amplifier. The mode-locked laser diode has a gain region with a basic mode-locked oscillation frequency and a saturable absorptive region. By the lasing oscillation of the diode, the diode's oscillation frequency is pulled into the clock frequency of the data pulse stream so that the clock timing of the data pulse stream is extracted and a stream of constant-amplitude output pulses precisely aligned in phase with the input pulses can be obtained as a low-noise optical clock pulse stream. This low-noise clock pulse stream is delayed so that its pulse timing is aligned with the output pulse of the light amplifier. On the other hand, the data stream that is incident on the light amplifier is sufficiently amplified by the light amplifier in relation to the intensity of the delayed clock pulse stream so that the data pulse dominates the on-off control of an optical gate, or a semiconductor waveguide saturable absorber.

If the output of a mode-locked laser diode has the same wavelength as that of the input, undesired disturbance would result. More specifically, since the diode has a small internal loss, energy leaving the absorptive region of the device would be subject to induced amplification in the gain region and circulate through the resonator. As a result, the gain and absorption characteristics of the device are randomly modulated. In order to avoid such a disturbance, the current mode-locked laser diode is designed to produce an output that is different in wavelength from the input.

Thus, the delayed clock pulse has a different wavelength from the output of the light amplifier. Because of their different wavelengths, they are coupled together by an optical coupler. The combined optical signal is entered into the optical gate through one of its ports, where the clock pulse stream is patterned after the amplified data pulse and delivered from the other port of the optical gate. An optical filter is coupled to the output of the optical gate to eliminate components other than the modulated clock pulse stream.

Optical repeaters are used extensively in wavelength division multiplex optical communication systems. However, wavelength division multiplexing requires in most cases that the output of an optical repeater be the same in wavelength as that of the incident optical signal. Therefore, a need does exist to develop optical repeaters capable of producing the same wavelength as that of the incident signal.

SUMMARY OF THE INVENTION

It is therefore an object of the present invention to provide an optical repeater for regenerating data pulses of wavelength equal to the wavelength of input data pulses.

The stated object is obtained by the use of cascaded first and second mode-locked laser diodes operating in a passive synchronization mode at different wavelengths for clock extraction from an optical data pulse stream. The first mode-locked laser diode produces coherent clock pulses of wavelength different from the input data pulse stream and the second mode-locked laser diode produces coherent clock pulses of wavelength equal to the input data stream.

According to the present invention, there is provided an optical repeater comprising an optical splitter for splitting an optical data pulse stream of first wavelength into first and second components, and a first mode-locked laser diode connected to receive the first component of the optical data pulse stream from the optical splitter for producing a first clock pulse stream of second wavelength different from the first wavelength, the first clock pulse stream having a frequency synchronized to the optical data pulse stream. A second mode-locked laser diode is connected to receive the first clock pulse from the first mode-lock laser diode for producing a second clock pulse stream of wavelength equal to the first wavelength, the second clock pulse stream having a frequency synchronized to the first clock pulse stream. A light amplifier amplifies the second component of the optical data pulse stream from the optical splitter. An optical modulating device modulates the second clock pulse stream with the amplified data pulse stream to produce an output data pulse stream of retimed and reshaped pulse waveform.

BRIEF DESCRIPTION OF THE DRAWINGS

The present invention will be described in further detail with reference to the accompanying drawings, in which:

FIG. 1 is a block diagram of an optical repeater according to the present invention; and FIG. 2 is a graphic representation of the energy density of optical pulse streams across the light spectrum.

DETAILED DESCRIPTION

Referring to FIG. 1, there is shown an optical repeater according to the present invention. The optical repeater is comprised of an optical coupler 1 that splits an incident 10-Gbps optical data pulse stream of wavelength centered at $\lambda_0$, or 1.550 μm with a pulse duration of 5 picoseconds into two components of equal intensity. The energy density of the optical data pulse stream from laser diode 2 has a peak value at the center wavelength $\lambda_0$ of its spectrum as indicated by a dotted line 20 in FIG. 2. The first component of the optical input is presented to a 10-GHz mode-locked laser diode 2 operating in a passive synchronization mode, where the input data pulse is converted to a coherent optical constant-amplitude pulse stream of wavelength centered at $\lambda_1$, or 1.555 μm with a 5-ps pulse duration. The energy density of this optical clock pulse stream has a peak value at the center wavelength $\lambda_1$, of its spectrum as indicated by a dotted line 21 in FIG. 2. Laser diode 2 is of an InGaAsP heterojunction structure in which a gain region and a saturable absorptive region are constructed to provide a distributed constant feedback structure. Although not shown, the laser diode is a module including optical elements such as optical isolators and lenses so that it can be optically coupled to external devices. Because of the wavelength separation between $\lambda_0$ and $\lambda_1$, no disturbance occurs in the mode-locked laser diode 2.

The output of the laser diode 2 is attenuated in intensity by an optical attenuator 3 and entered to a 10-GHz mode-locked laser diode 4 of the structure identical to that of laser diode 2 except that the center wavelength of its optical spectrum is equal to to $\lambda_0$, i.e.1.550 μm, producing a second coherent clock pulse stream of wavelength $\lambda_0$ synchronized to the first clock pulse stream from the laser diode 2. The energy density of the second optical clock pulse stream has a peak value at the center wavelength $\lambda_0$ of its spectrum as indicated by a solid line 22 in FIG. 2.

The output of laser diode 4 is delayed by an optical delay element 5 for pulse timing alignment and supplied to a first input port of an optical gate 6, or a semiconductor waveguide saturable absorber. Since the clock pulses obtained by the first laser diode 2 contains no modulating data components, the clock pulses obtained from the second laser diode 4 has a low content of noise.

On the other hand, the second component of the input data signal is fed to a light amplifier 7, such as an erbium-doped fiber amplifier, where it is amplified sufficiently in relation to the delayed clock pulse stream to control the light transmissivity of optical gate 6. Since the output of optical delay 5 is different in wavelength from the output of light amplifier 7, they can be separated according to their directions of propagation after the former is modulated with the latter. As a gate control signal, the output of the light amplifier 7 is coupled through an optical directional coupler or circulator 8 to a second input port of the optical gate 6 which is located in a position opposite to the first input port. Thus, the pulse streams applied to the first and second input ports propagate through the optical gate 6 in opposite directions.

The amount of delay introduced by the optical delay 5 is such that the pulse timing of the clock pulse stream from mode-locked laser diode 4 is aligned with the pulse timing of the amplified data pulse. As a result, the optical gate 6 is controlled by the amplified data pulse stream and the delayed clock pulses are modulated with the data pulse stream. The pattern of input data pulse stream is thus impressed on the delayed clock pulse stream of the same wavelength as that of the input data pulse stream. The modulated pulse stream is directionally separated from the modulating data pulse stream by means of the optical circulator 8.

A 10-Gbps noiseless optical data stream is recovered from the 10-Gbps noise-containing input data stream. The output data stream of the optical repeater is withdrawn from the optical gate 6 with use of the optical circulator 8 for delivery to an output light waveguide 9.

Because of the input and output data streams having equal wavelengths, the optical. repeater of this invention can be advantageously used in wavelength division multiplex communication systems. Another advantage of the present invention is that the use of cascaded mode-locked laser diodes allows a wide range of tolerances to clock extraction performance and permits regeneration of sharply defined optical pulses.

In a preferred embodiment, the optical repeater includes a first wavelength filter 10 connected between the mode-locked laser diode 2 and the optical attenuator 3 and a second wavelength filter 11 connected between the mode-locked laser diode 4 and the optical delay element 5. The first wavelength filter 10 has a passband centered at wavelength $\lambda_1$ and the second wavelength filter 11 has a passband centered at wavelength $\lambda_0$. The use of wavelength filters 10 and 11 is to remove data components from the clock pulse streams.

What is claimed is:

1. An optical repeater comprising:

an optical splitter for splitting an optical input data pulse stream of first wavelength into first and second components;

a first mode-locked laser diode connected to receive the first component of the optical data pulse stream from the optical splitter for producing therefrom a first clock pulse stream of second wavelength different from said first wavelength, the first clock pulse stream being synchronized to the optical input data pulse stream;

a second mode-locked laser diode connected to receive the first clock pulse from the first mode-lock laser diode for producing therefrom a second clock pulse stream of wavelength equal to said first wavelength, the second clock pulse stream being synchronized to the first clock pulse stream;

a light amplifier for amplifying the second component of the optical input data pulse stream from the optical splitter; and an optical modulating device for modulating said second clock pulse stream with the amplified data pulse stream.

2. The optical repeater of claim 1, further comprising optical timing means for introducing a delay time to one of said second optical clock pulse stream and said amplified data pulse stream for aligning pulse timing of the pulse streams.

3. The optical repeater of claim 1, further comprising a first wavelength filter connected between said first and second mode-locked laser diodes and a second wavelength filter connected between said second mode-locked laser diode and said optical modulating device, said first wavelength filter having a passband centered at said second wavelength and said second wavelength filter having a passband centered at said first wavelength.

4. The optical repeater of claim 1, wherein said optical modulating device comprises:

an optical gate having first and second ports located at opposite ends thereof for receiving said second clock pulse stream at said first port; and an optical coupling device for coupling the amplified data pulse stream to the second port of the optical gate to modulate said second clock pulse stream with the amplified data pulse stream and delivering the modulated second clock pulse stream to an output terminal of the optical regenerator.

5. The optical repeater of claim 1, wherein said optical coupling device comprises an optical circulator.

6. The optical repeater of claim 1, each of said first and second mode-locked laser diodes has a gain region and a saturable absorptive region and is operable in a passive synchronization mode.

* * * * *